United States Patent
Sakashita et al.

(10) Patent No.: US 7,793,971 B2
(45) Date of Patent: Sep. 14, 2010

(54) STRUT SHOCK ABSORBER

(75) Inventors: Taku Sakashita, Tokyo (JP); Masaru Fukushima, Tokyo (JP); Masahiro Miwa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 519 days.

(21) Appl. No.: 11/783,670

(22) Filed: Apr. 11, 2007

(65) Prior Publication Data

US 2007/0267260 A1 Nov. 22, 2007

(30) Foreign Application Priority Data

May 22, 2006 (JP) .............................. 2006-141365

(51) Int. Cl.
*B21D 53/88* (2006.01)
*F16F 9/36* (2006.01)
*F16F 9/54* (2006.01)

(52) U.S. Cl. ................. 280/673; 29/897.2; 188/322.19; 188/321.11; 188/322.16

(58) Field of Classification Search .......... 280/124.146, 280/124.154, 93.512, 673, 668; 29/897.2; 188/322.19, 321.11, 322.16; 403/384; 248/230.1, 248/124.1, 300, 631
See application file for complete search history.

(56) References Cited

U.S. PATENT DOCUMENTS

| | | | | |
|---|---|---|---|---|
| 3,346,272 A * | 10/1967 | Smith | ................... | 280/124.147 |
| 4,648,623 A * | 3/1987 | Cameron | ............. | 280/124.155 |
| 5,244,064 A * | 9/1993 | Furuta | ................... | 188/322.19 |
| 5,308,032 A * | 5/1994 | Ohta | ........................ | 248/230.2 |
| 5,772,168 A * | 6/1998 | Nakazawa et al. | .......... | 248/300 |
| 5,896,960 A * | 4/1999 | Ananthanarayanan | .. | 188/321.11 |
| 6,367,751 B1 * | 4/2002 | Perrott | ..................... | 248/218.4 |
| 6,881,004 B2 | 4/2005 | Handke | | |
| 7,137,201 B2 * | 11/2006 | Brodt et al. | ................. | 29/897.2 |
| 2002/0027050 A1 | 3/2002 | Takakusaki | | |
| 2002/0069506 A1 | 6/2002 | Brodt et al. | | |
| 2003/0178268 A1* | 9/2003 | Ananthanarayanan et al. | ..................... | 188/321.11 |
| 2004/0112872 A1* | 6/2004 | Chen et al. | ..................... | 219/93 |
| 2005/0146162 A1* | 7/2005 | Gerick et al. | .......... | 296/203.01 |
| 2006/0006156 A1* | 1/2006 | Huonker et al. | ......... | 219/121.64 |
| 2006/0049605 A1* | 3/2006 | Schuyten | ............. | 280/124.146 |

(Continued)

FOREIGN PATENT DOCUMENTS

JP 03014938 A * 1/1991

(Continued)

*Primary Examiner*—Paul N Dickson
*Assistant Examiner*—Karen Jane J Amores
(74) *Attorney, Agent, or Firm*—Rabin & Berdo, PC

(57) ABSTRACT

In a strut type shock absorber (1), a lower cap (2) is welded onto an inner circumferential surface of an outer shell (3) at a step (16) formed in a retreated position from an axial tip of the outer shell (3). The axial tip of the outer shell (3) is welded onto the inner circumferential surface of a knuckle bracket (6) which holds the outer shell (3). Since welding of the lower cap (2) onto the outer shell (3) and welding of the knuckle bracket (6) onto the outer shell (3) are conducted at different positions, the lower cap (2) is welded onto the outer shell (3) without suffering from blowholes irrespective of the material forming the knuckle bracket (6), and as a result, a weld bead (17) having a high degree of air-tightness is formed.

10 Claims, 2 Drawing Sheets

U.S. PATENT DOCUMENTS

| | | | |
|---|---|---|---|
| 2006/0065639 A1* | 3/2006 | Musselman | 219/121.14 |
| 2006/0191757 A1* | 8/2006 | Kojima | 188/322.16 |
| 2006/0289393 A1* | 12/2006 | Revel et al. | 219/75 |
| 2007/0267260 A1* | 11/2007 | Sakashita et al. | 188/322.19 |
| 2008/0178467 A1* | 7/2008 | Hayashi et al. | 29/897.2 |
| 2009/0011269 A1* | 1/2009 | Urushihara et al. | 428/594 |

FOREIGN PATENT DOCUMENTS

JP  09-105437  4/1997

* cited by examiner

STRUT SHOCK ABSORBER

FIELD OF THE INVENTION

This invention relates to the welding of a knuckle bracket and a lower cap onto a strut type shock absorber.

BACKGROUND OF THE INVENTION

JPH09-105437A, published by the Japan Patent Office in 1997, refers to the welded construction of a lower cap closing a lower tip of an outer shell of a strut type shock absorber, and a knuckle bracket holding the outer shell. According to this welded construction, fixing of the lower cap onto the outer shell and fixing of the knuckle bracket onto the outer shell can be performed all at once.

SUMMARY OF THE INVENTION

In this welded construction, when the knuckle bracket is formed from a galvanized sheet metal, which is known to be rust resistive, and the outer shell and lower cap are formed from a non-galvanized sheet metal, electric-arc welding of these parts causes the following problem.

Specifically, heat due to electric-arc welding vaporizes zinc used in the galvanization, and a pore defect such as the formation of blowholes occurs in the weld bead. The blowholes not only decrease the strength of the welding but also adversely affect the air-tightness of the weld bead formed between the outer shell and the lower cap. As a result, a gas or hydraulic oil enclosed in the outer shell may leak through the weld bead.

The prior art also proposes interposing a reinforcing tube between the outer shell and the knuckle bracket. This construction however does not improve the air-tightness of the weld bead formed between the outer shell and the lower cap.

It is therefore an object of this invention to provide a weld construction of a strut type shock absorber which realizes a high degree of air-tightness in the weld bead between the outer shell and the lower cap.

In order to achieve the above object, this invention provides a strut type shock absorber comprising an outer shell formed from a non-galvanized sheet metal in a cylindrical shape having an axial tip, a knuckle bracket formed from a galvanized sheet metal and welded onto the axial tip, and a lower cap formed from a non-galvanized sheet metal and having an outer rim portion welded onto an inner circumferential surface of the outer shell in a retreated position from the axial tip of the outer shell.

The details as well as other features and advantages of this invention are set forth in the remainder of the specification and are shown in the accompanying drawings.

DESCRIPTION OF THE PREFERRED EMBODIMENTS

Figure 1:
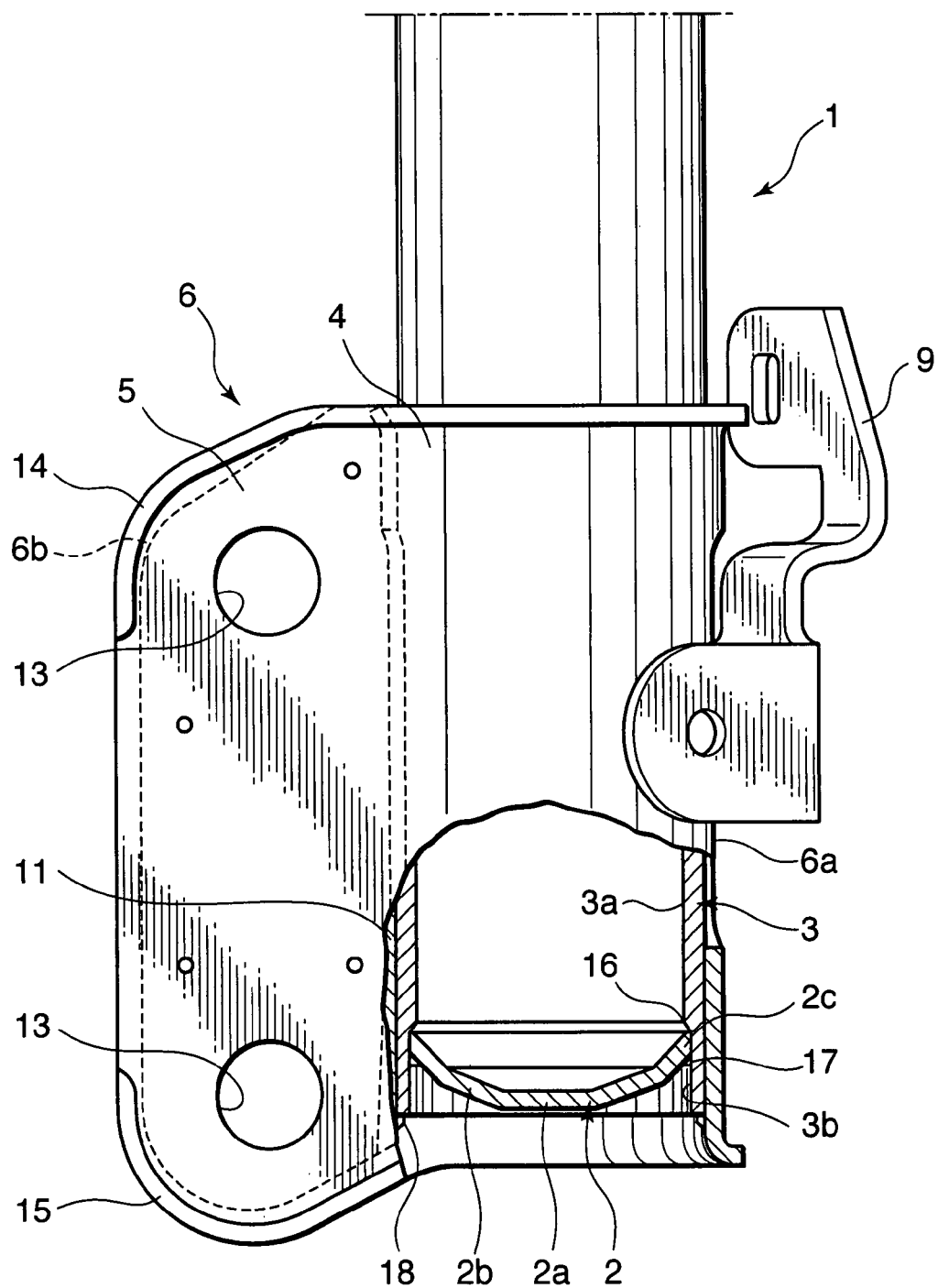
FIG. 1 is a side view of a lower part of a strut type shock absorber and a knuckle bracket according to this invention.

Referring to FIG. 1 of the drawings, a strut type double cylinder shock absorber 1 for a vehicle comprises an outer shell 3, an axial tip of which corresponds to a lower tip when the shock absorber 1 is in an in-service state, and is closed by a lower cap 2.

In the following description, the terms "lower" and "upper" are used as terms indicating the relative location of the parts of the shock absorber 1 in the in-service state.

A knuckle bracket 6 is fixed onto the outer circumference of a lower part of the outer shell 3.

Figure 2:
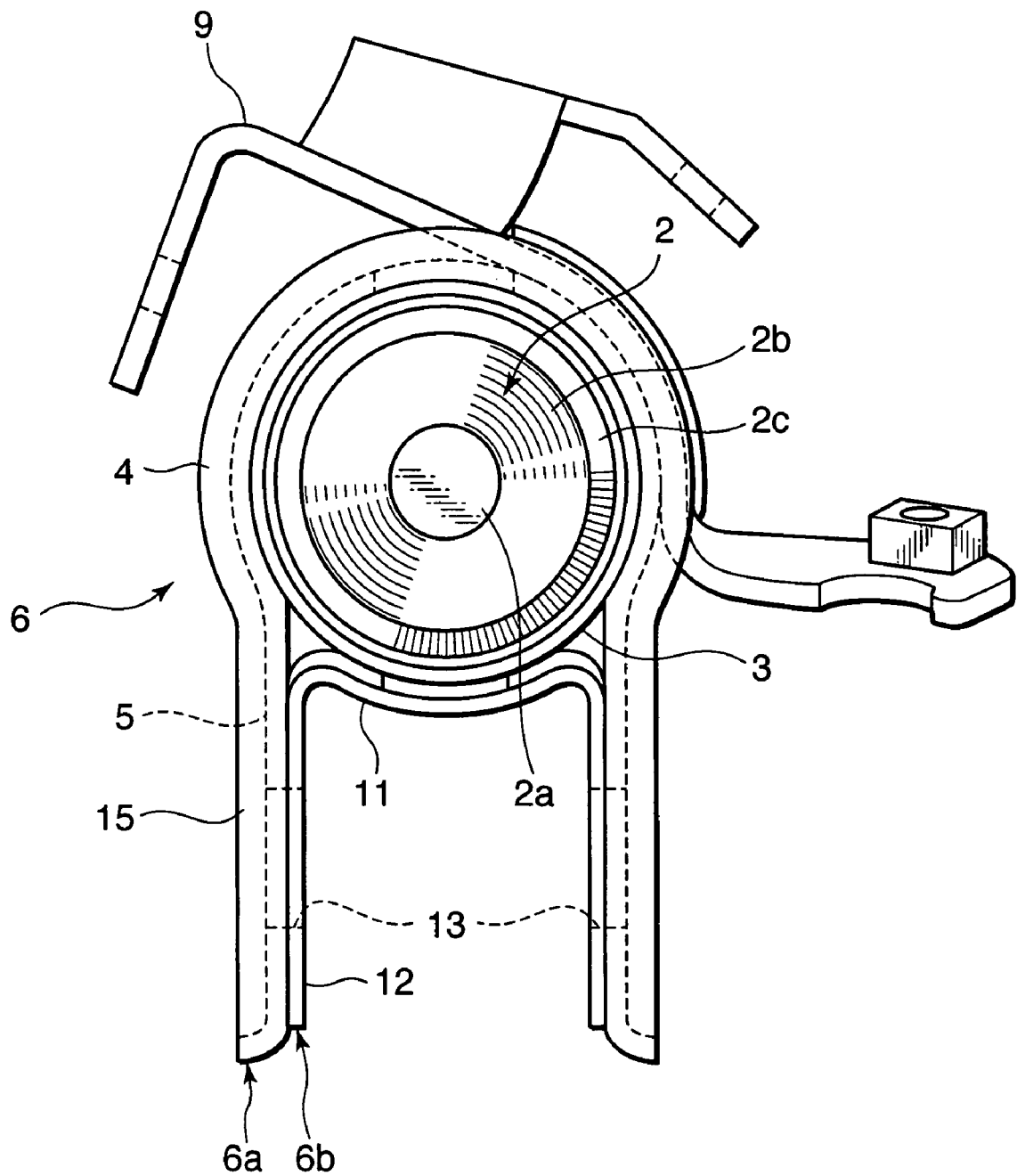
FIG. 2 is a bottom view of the shock absorber and the knuckle bracket seen from below.

Referring to FIG. 2, the knuckle bracket 6 comprises an outer bracket 6a and an inner bracket 6b.

The outer bracket 6a comprises a curved portion 4 with an arc-shaped horizontal section and a pair of outer plates 5 which extend laterally in parallel with each other from both ends of the curved portion 4.

The inner bracket 6b comprises a curved portion 11 having an arc-shaped horizontal section forming a substantially circular cross-section in combination with the curved portion 4 of the outer bracket 6a, and a pair of inner plates 12 which extend laterally from both ends of the curved portion 11 so as to overlap the pair of outer plates 5 on the inner side of the outer plates 5.

The inner bracket 6b is fixed onto the outer bracket 6a by projection welding in a state where the pair of inner plate 12 overlap the pair of outer plates 5 on the inner side of the outer plates 5.

A pair of vertically aligned bolt holes 13 are formed respectively through the inner plate 12 and the outer plate 5. A knuckle spindle is fixed to the knuckle bracket 6 by inserting the knuckle spindle into a space between the pair of the inner plates 12 and securing nuts onto the tips of bolts penetrating the bolt holes 13 of the knuckle spindle and the knuckle bracket 6.

The outer shell 3 is inserted into a cylindrical space formed by the curved portions 4 and 11 of the knuckle bracket 6.

Referring again to FIG. 1, the lower tip of the outer shell 3, which is inserted into the cylindrical space formed by the curved portions 4 and 11, is welded onto the inner circumferential surface of the curved portion 4 and 11 by electric-arc welding. A lower cap 2 is welded onto the outer shell 3 by electric-arc welding so as to close an opening in the lower tip of the outer shell 3.

The position in which the lower cap 2 is welded onto the outer shell 3 is set in a retreated position from the lower tip of the outer shell 3 into the interior of the outer shell 3. The welding position of the lower cap 2 corresponds to a step 16 formed on the inner circumferential surface of the outer shell 3 above the lower tip.

The outer shell 3 comprises a main portion 3a located above the step 16 and an extension portion 3b located below the step 16. The main portion 3a and the extension portion 3b are formed to have an identical outer diameter while the extension portion 3b has a greater inner diameter than the main portion 3a. The step 16 forms a boundary between the main portion 3a and the extension portion 3b, which have different inner diameters.

The lower cap 2 is formed into a substantially semi-spherical shape having a flat circular central portion 2a bulging downward. The lower cap 2 further comprises an inclined portion 2b extending radially from the central portion 2a and an outer rim portion 2c extending further radially with a further inclination from the inclined portion 2b. The lower cap 2 is fixed to the outer shell 3 by applying electric-arc welding from below between the outer rim portion 2c and the inner circumferential surface of the outer shell 3 in a state where the outer rim portion 2c is in contact with the step 16.

As a result of this electric-arc welding, when viewed from below, a ring-shaped weld bead 17 is formed along the boundary between the outer rim portion 2c and the inner circumferential surface of the extension portion 3b.

The length of the extension portion 3b of the outer shell 3 in the axial direction is set to be longer than the dimension of the lower cap 2 in the axial direction. The lower cap 2 therefore does not project downward from the extension portion 3b. It should be noted that an inner shell and a base valve fitted to the inner shell are enclosed in the interior of the outer shell 3 above the lower cap 2.

Further, the knuckle bracket 6 is fixed to the outer shell 3 by applying electric-arc welding from below to the boundary between the lower tip of the extension portion 3b and the inner circumferential surface of the curved portion 4 as well as that of the curved portion 11 of the outer bracket 6a.

As a result of this electric-arc welding, when viewed from below, a ring-shaped weld bead 18 is formed along the boundary between the lower tip of the extension portion 3b and the inner circumferential surface of the curved portions 4 and 11.

The lower tip of the curved portions 4, 11 reaches further downward than the lower tip of the extension portion 3b, as shown in the figure. In other words, a distance from the step 16 to the lower tip of the curved portions 4, 11 of the knuckle bracket 6 is set to be greater than a distance from the step 16 to the lower tip of the extension portion 3b of the outer shell 3. As a result, the extension portion 3b does not project downward from the knuckle bracket 6, and hence the extension portion 3b does not impede fixing of the shock absorber 1 to the vehicle.

An upper tip and lower tip of the outer bracket 6a are bent outward and respectively form an upper rib 14 and a lower rib 15 which help in increasing the rigidity of the knuckle bracket 6. On the outer circumference of the curved portion 4 of the outer bracket 6a, a hose bracket 9 adapted to guide a brake hose is fixed by welding.

The knuckle bracket 6 is formed from a galvanized sheet metal including the outer bracket 6a and inner bracket 6b. The outer shell 3 and the lower cap 2 are formed from a non-galvanized sheet metal.

In this strut type shock absorber 1, the weld bead 17 fixing the lower cap 2 onto the outer shell 3 requires a high degree of air-tightness, while the weld bead 18 fixing the knuckle bracket 6 onto the outer shell 3 does not require a high degree of air-tightness.

Blowholes are rarely formed in the weld bead 17 which is applied between two galvanized sheet metal members, and hence the weld bead 17 satisfies not only structural strength requirements, but also air-tightness requirements. In contrast, blowholes tend to be formed in the weld bead 18 which is applied between a galvanized sheet metal member and a non-galvanized sheet metal member, but no special inconvenience arises therefrom since air-tightness is not required in the weld bead 18.

According to this invention, therefore, the welding operation is optimized according to the required weld quality by independently forming the weld bead 17 joining two sheet metal members of the same specifications in a case where air-tightness is required and the weld bead 18 joining two sheet metal members of different specifications in a case where air-tightness is not required.

Further, according to the shock absorber 1, the weld bead 17 and weld bead 18 are formed in distant locations, and therefore the respective welding operations can be performed without incurring a thermal effects from the other.

The fixing operation of the knuckle bracket 6 onto the outer shell 3 is conducted in the following manner.

Specifically, the lower cap 2 is first inserted into the interior of the extension portion 3b of the outer shell 3 from below, and in a state where the outer rim portion 2c is in contact with the step 16, electric-arc welding is applied between the outer rim portion 2c and the inner circumferential surface of the extension portion 3b. The weld bead 17 is formed as a result of this operation.

Next, the lower part of the outer shell 3 is inserted into the space having a circular cross-section surrounded by the curved portions 4, 11 of the outer bracket 6a and the inner bracket 6b. When the lower tip of the extension portion 3b has reached a predetermined position located slightly higher than the lower tip of the curved portions 4, 11, the tip of the extension portion 3b is welded by electric arc welding from below onto the inner circumference of the curved portion 4, 11. The weld bead 18 is formed as a result of this operation.

According to the above operations, the lower cap 2 is fixed onto the outer shell 3 with a weld bead 17 which rarely has blowholes. On the other hand, the weld bead 18 between the outer shell 3 and the knuckle bracket 6 may have blowholes, but the weld bead 18 does not require a high degree of air-tightness. It is also possible to fix the lower cap 2 onto the outer shell 3 using a certain welding electrode, and then fix the knuckle bracket 6 onto the outer shell 3 using the same welding electrode.

By using the same welding electrode in this manner, there is no need to prepare different welding devices for different sites. The welding cost therefore decreases even though the welding amount is increased with respect to the prior art. Further, the welding operation is technically easier than the welding operation required in the prior art device, in which all three members are joined at once.

The contents of Tokugan 2006-141365, with a filing date of May 22, 2006 in Japan, are hereby incorporated by reference. Although the invention has been described above with reference to certain embodiments of the invention, the invention is not limited to the embodiments described above. Modifications and variations of the embodiments described above will occur to those skilled in the art, within the scope of the claims.

For example, in the above embodiment, this invention is applied to a shock absorber 1 of a strut type double cylinder. However, this invention may be applied to a strut type single cylinder shock absorber.

In the above embodiment, the extension portion 3b is formed integrally with the main portion 3a as a part of the outer shell 3, but it is possible to fix an independent extension portion 3b onto the lower tip of the main portion 3a. It is also possible to dispose the lower tip of the extension portion 3b at the same level as the lower tip of the curved portions 4, 11.

This invention is applicable to a shock absorber in which the outer shell 3 is supported only by the outer bracket 6a instead of supporting the outer shell 3 by the combination of the outer bracket 6a and the inner bracket 6b.

The embodiments of this invention in which an exclusive property or privilege is claimed are defined as follows:

What is claimed is:

1. A strut shock absorber comprising:
an outer shell formed from a non-galvanized sheet metal in a cylindrical shape having an axial tip;
a knuckle bracket formed from a galvanized sheet metal and welded onto the axial tip by a first weld bead formed between the knuckle bracket and the axial tip of the outer shell; and
a lower cap formed from a non-galvanized sheet metal and having an outer rim portion welded onto an inner circumferential surface of the outer shell by a second weld bead formed between the outer rim portion and an inner circumferential surface of the outer shell, the second weld bead being disposed at a position away from and retreated from the first weld bead.

2. The strut shock absorber as defined in claim 1, wherein the outer shell comprises a main portion, and an extension portion which extends from the main portion to the axial tip and has a greater inner diameter than the main portion while having an identical outer diameter to the main portion, and the retreated position corresponds to a step formed on the inner circumferential surface of the outer shell between the main portion and the extension portion.

3. The strut shock absorber as defined in claim 2, wherein the lower cap comprises an outer rim portion which is welded onto the inner circumferential surface of outer shell by electric-arc welding in a state where the outer rim portion is in contact with the step.

4. The strut shock absorber as defined in claim 2, wherein the lower cap is formed into a semi-spherical shape bulging in a direction toward the axial tip of the outer shell, the extension portion is set to be greater than a dimension of the lower cap in the direction extending toward the axial tip of the outer shell.

5. The strut shock absorber as defined in claim 1, wherein the knuckle bracket comprises a curved portion which fits onto an outer circumference of the outer shell, and the axial tip of the outer shell is welded onto an inner circumferential surface of the curved portion.

6. The strut shock absorber as defined in claim 5, wherein a distance from the retreated position to the axial tip of the curved portion is set to be greater than a distance from the retreated position to the axial tip of the outer shell.

7. The strut shock absorber as defined in claim 6, wherein the knuckle bracket comprises an outer bracket and an inner bracket, and the curved portion are formed in both of the outer bracket and the inner bracket.

8. A method for manufacturing a strut shock absorber, comprising:
    forming an outer shell from a non-galvanized sheet metal into a cylindrical shape having an axial tip;
    forming a knuckle bracket from a galvanized sheet metal;
    welding the knuckle bracket onto the axial tip;
    forming a lower cap from a non-galvanized sheet metal; and
    welding an outer rim portion thereof to an inner circumferential portion of the outer shell in a position disposed away from and retreated from the axial tip of the outer shell, subsequently to the welding the knuckle bracket onto the axial tip.

9. The method as defined in claim 8, wherein the welding the knuckle bracket and the welding the outer rim portion of the lower cap respectively form a first annular weld and a second annular weld.

10. The method as defined in claim 9, wherein the second annular weld is airtight.

* * * * *